J. P. HEDSTROM.
SAW SWAGE.
APPLICATION FILED JUNE 28, 1920.

1,401,694.  Patented Dec. 27, 1921.

Inventor
John P. Hedstrom
By Frank E. Liverance, Jr.
Attorney

UNITED STATES PATENT OFFICE.

JOHN P. HEDSTROM, OF BIG RAPIDS, MICHIGAN, ASSIGNOR TO MACHINERY COMPANY OF AMERICA, OF BIG RAPIDS, MICHIGAN, A CORPORATION OF MICHIGAN.

SAW-SWAGE.

1,401,694.

Specification of Letters Patent.  Patented Dec. 27, 1921.

Application filed June 28, 1920. Serial No. 392,309.

*To all whom it may concern:*

Be it known that I, JOHN P. HEDSTROM, a citizen of the United States of America, residing at Big Rapids, in the county of Mecosta and State of Michigan, have invented certain new and useful Improvements in Saw-Swages; and I do hereby declare the following to be a full, clear, and exact description of the invention, such as will enable others skilled in the art to which it appertains to make and use the same.

This invention relates to a saw swaging tool by means of which the teeth of saws may be swaged, the metal at the point of the tooth being upset and widened at the point and below the same on the inner side of the tooth. My invention has for its primary object and purpose, the construction of a tool of this character in which the swaging die may be very readily removed at any time for inspection, changing of position and oiling. A further object of the invention is to construct a tool which comprises many novel features of construction and operation all tending to a betterment of operation, endurance and effectiveness of the tool, one feature in particular relating to a bushing mounting for the swaging die which serves to keep the die properly positioned with reference to the remainder of the tool and hold the same in strict alinement at all times, there being little or no wear on said bushings such that the die might become eccentric in its alinement. Various other objects and purposes than those specifically enumerated will appear fully and in detail as understanding of the invention is had from the following description, taken in connection with the accompanying drawing, in which, Figure 1 is a side elevation of the swaging tool showing the same applied to a saw.

Like reference characters refer to like parts in the different views of the drawing.

Figure 1:
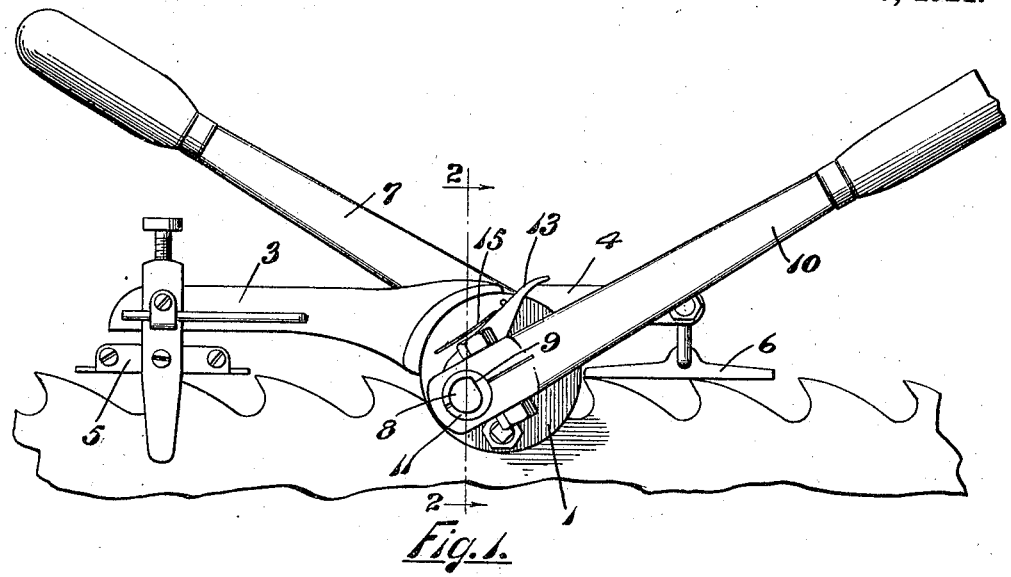
Figure 2:
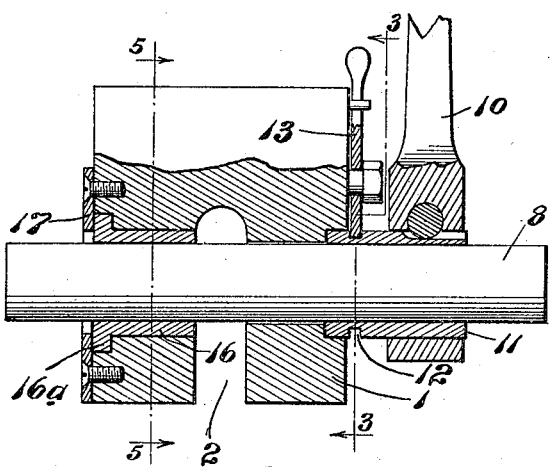
Fig. 2 is a vertical transverse section substantially on the line 2—2, of Fig. 1.
Figure 3:
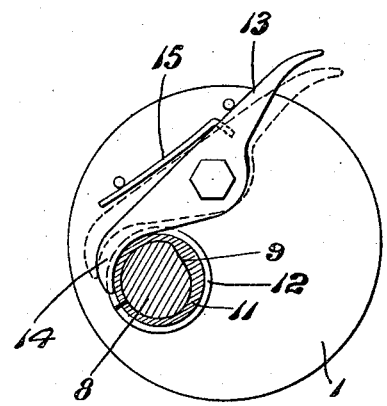
Fig. 3 is a section and end view substantially on the line 3—3, of Fig. 2.
Figure 4:
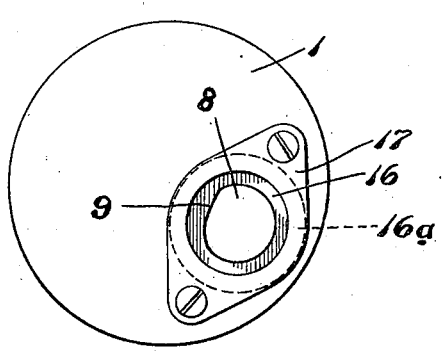
Fig. 4 is an end view looking at the end opposite to that shown in Fig. 3.
Figure 5:
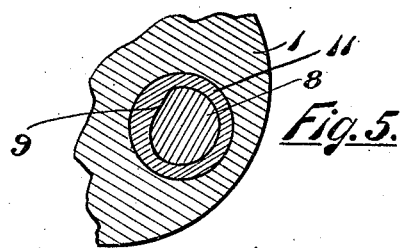
Fig. 5 is a fragmentary vertical section on line 5—5 of Fig. 2.

In the construction of the swaging tool, a central block 1 is used it being slotted upwardly from its lower side as indicated at 2. Bars 3 and 4 extend in opposite directions from the block 1 and guide bars 5 and 6 are operatively connected therewith adjacent their free ends, the same resting on teeth of the saw each side of the tooth being swaged so as to properly hold the tool. The handle 7 is also a part of the tool and operates a gripping device for holding the tool on the saw but the same is not shown as it is old construction and no part of the present invention.

The swaging die comprises a rod 8 which has the major portion of its surface curved in the arc of a circle. The remainder of the surface is eccentric with the center or axis of the rod and finally terminates in a flat portion as indicated at 9. It is apparent that when the rod is turned said eccentric and flat surfaces coming against the under inner edges of a saw tooth serve to compress and upset the metal and widen the same at and adjacent the point of the tooth. This swaging die rod in itself is not new, the present invention being concerned with the novel detachable and adjustable mounting of the same as will now be described.

The rod is turned by a handle 10 which is attached to a bushing 11 interiorly formed so as to freely pass and receive the die rod 8. The handle is attached to the bushing and the bushing to the die rod by the usual binding screw, the loosening of which frees the die rod for adjustment to a different position in the bushing when desired. This bushing at its inner end is received in a recess made in the end of the block 1 in which it has bearing. The bushing is formed with an annular groove 12 around it which comes close to the outer surface of said block 1 when the bushing is seated in the recess. A latch lever 13 is pivotally mounted between its ends on the adjacent end of the block being formed at its lower end with a bill 14 which normally seats in the groove 12 under the action of spring 15. The outer end of the lever 13 may be manually operated to disconnect the bill thereof from the bushing so as to free the same and permit removal of the die rod 8, bushing 11 and handle 10 from the tool.

A second bushing 16 is located in the opposite side of the block 1 having a flange 16ª which limits the insertion of the bushing in the opening made for it, the outer side of the flange being flush with the outer end of the block 1. The bushing is removably held in place by a plate 17 attached by screws to the block and lying over the flange 16ª but having a central opening to pass the die rod 8.

From the construction described, it is apparent that the die rod may be readily removed at any time from the tool for an inspection of the die surfaces and if said surfaces are damaged or otherwise rendered unfit for swaging, the position of the rod with respect to the bushing 11 may be readily changed before it is replaced. In addition, the easy and ready removability of the die rod 8 is very desirable as oil should be applied to the die surfaces frequently in the practical use of the tool, and this application can be best made when the die rod is removed. The bushings 11 and 16 hold the die rod positively in alinement, furnish a large bearing surface to take the pressure to which the rod is subjected in use, and if the same should ever become flattened at one side or otherwise not true it is very easy to replace the same or remove the same for repairs. The construction is particularly practical, durable and efficient and has been in actual practical service long enough to demonstrate its complete success.

I claim:

1. In a saw swage, the combination of a swage block, an elongated swaging die passing through the block, a bushing mounted on the die and adapted to seat in a recess in the block in which it has bearing, said bushing being provided with an annular groove around the same, an operating handle operatively connected to the die, and a lever pivotally mounted on the block and normally entering the groove in the bushing to hold the bushing against detachment from the block, said lever being movable to free the bushing and associated die for removal from the block, substantially as described.

2. In a saw swage, the combination of a swage block, said block having a shallow recess in one side thereof, a bushing seating at one end in and having bearing in the recess, said bushing being provided with an annular groove around the same, an elongated swaging die passing through the bushing and through the block, an operating handle connected to the bushing, means for securing the handle to the bushing and binding the bushing against the die, whereby said die may be adjusted lengthwise with respect to the bushing on loosening said handle securing means, and a lever pivotally mounted on the block and normally engaging at one end in the groove in the bushing, substantially as and for the purposes described.

3. In a saw swage, a swaging block having an upwardly extending slot in its under portion and a shallow cylindrical recess in one side, a cylindrical opening being made in the opposite side of the bushing through to the slot, a bushing seated at one end in the recess, means for detachably connecting the bushing to the block, a second bushing located in said cylindrical opening, means for detachably securing the second bushing to the block, both of said bushings being rotatable with respect to the block, an elongated swaging die passing freely through both bushings, means to secure the die and first bushing in fixed relation to each other, and an operating handle operatively connected with the die for turning it about its longitudinal axis, substantially as described.

4. In a saw swage, a swaging block having a cylindrical opening in one side, a bushing rotatably seated in the opening, a swaging die passing through the bushing, means for detachably connecting the die with the block, an operating handle for the die, and a plate detachably connected to the block and engaging against the end of the bushing to retain the same in place, said plate having an opening to pass the die, substantially as described.

In testimony whereof I affix my signature.

JOHN P. HEDSTROM.